(12) United States Patent
Kojima

(10) Patent No.: US 7,929,830 B2
(45) Date of Patent: Apr. 19, 2011

(54) RECORDING, REPRODUCING, AND RECORDING/REPRODUCING APPARATUSES FOR RECORDING INPUT DATA IN A RECORDING MEDIUM CAPABLE OF NON-LINEAR ACCESS AND METHODS THEREOF

(75) Inventor: Toshiaki Kojima, Kanagawa (JP)

(73) Assignee: Sony Corporation, Tokyo (JP)

( * ) Notice: Subject to any disclaimer, the term of this patent is extended or adjusted under 35 U.S.C. 154(b) by 1892 days.

(21) Appl. No.: 10/869,989

(22) Filed: Jun. 16, 2004

(65) Prior Publication Data

US 2004/0223733 A1 Nov. 11, 2004

Related U.S. Application Data

(63) Continuation of application No. 08/909,023, filed on Aug. 11, 1997, now Pat. No. 7,203,415.

(30) Foreign Application Priority Data

Aug. 12, 1996 (JP) .................................. P08-229308

(51) Int. Cl.
*H04N 5/93* (2006.01)
*H04N 5/84* (2006.01)
*H04N 5/765* (2006.01)
*H04N 5/932* (2006.01)
*G06F 9/34* (2006.01)
*G06F 9/46* (2006.01)
*G11B 19/02* (2006.01)
*G11B 27/02* (2006.01)

(52) U.S. Cl. ........ 386/287; 386/216; 386/231; 386/280; 386/281; 386/334; 360/13; 360/72.1; 360/72.2; 360/78.02; 711/220; 718/104; 718/106

(58) Field of Classification Search ................... 386/46, 386/4, 52, 55, 60, 116, 125, E5.001, E5.012, 386/E9.015; 360/13, 72.1, 72.2, 78.02; 369/83; 348/E5.008, E7.073; 707/10, 104.1, E17.009, 707/E17.028; 711/220; 712/E9.023, E9.027, 712/E9.041; 718/104, 106
See application file for complete search history.

(56) References Cited

U.S. PATENT DOCUMENTS

| 4,591,931 | A | * | 5/1986 | Baumeister .................. 360/72.1 |
| 5,485,321 | A | * | 1/1996 | Leonhardt et al. .............. 360/48 |
| 5,493,455 | A | | 2/1996 | Miyoshi et al. ................. 360/60 |
| 5,532,830 | A | | 7/1996 | Schuler ........................ 386/125 |
| 5,655,132 | A | * | 8/1997 | Watson ........................ 718/104 |

(Continued)

*Primary Examiner* — Thai Tran
*Assistant Examiner* — Syed Y Hasan
(74) *Attorney, Agent, or Firm* — K&L Gates LLP

(57) ABSTRACT

In recording, reproducing, and recording/reproducing apparatuses and methods thereof, while endlessly-recording first data, desired second data can be easily stored. The present invention comprises recording means for endlessly-recording the first data in a recording medium, input means for inputting a start and end point of the second data out of the first data, and control means, when the start point and end point are designated, for controlling the recording means so as to endlessly-record the first data while avoiding a recording region for the second data. Thereby, the second data can be stored without replacing the recording medium even if the second data is endlessly-recorded. In addition, when the start point and end point of the desired second data out of the first data are designated, the start point and end point are recorded, and then the first data is endlessly-recorded based on the recorded start point and end point while avoiding the recording region for the second data. Thereby, the second data can be stored without replacing the recording medium.

38 Claims, 5 Drawing Sheets

1 RECORDING/REPRODUCING APPARATUS

U.S. PATENT DOCUMENTS

| | | | |
|---|---|---|---|
| 5,737,481 A * | 4/1998 | Gushima et al. | 386/113 |
| 5,781,435 A * | 7/1998 | Holroyd et al. | 700/87 |
| 5,940,241 A | 8/1999 | Sasakura | 386/125 |
| 5,949,953 A | 9/1999 | Shirakawa et al. | 386/95 |
| 5,956,716 A * | 9/1999 | Kenner et al. | 707/10 |
| 6,128,148 A | 10/2000 | Platte et al. | 360/60 |

* cited by examiner

RECORDING, REPRODUCING, AND RECORDING/REPRODUCING APPARATUSES FOR RECORDING INPUT DATA IN A RECORDING MEDIUM CAPABLE OF NON-LINEAR ACCESS AND METHODS THEREOF

CROSS REFERENCE TO RELATED APPLICATIONS

The present application is a Continuation Application of U.S. patent application Ser. No. 08/909,023 filed on Aug. 11, 1997 now U.S. Pat. No. 7,203,415.

BACKGROUND OF THE INVENTION

1. Field of the Invention

The present invention relates to recording, reproducing, and recording/reproducing apparatuses and methods thereof, and more particularly, is suitably applied to a recording apparatus and a recording method for endlessly-recording image data and/or voice data (hereafter, referred to as AV data) in a recording medium.

2. Description of the Related Art

In this type of recording apparatus, for example, a tape recording medium is used as a recording medium. In this case, in the recording apparatus, the recording apparatus makes it possible to endlessly-record AV data to be recorded by repeating a series of operations such as recording the AV data from one end to the other end of a tape recording medium, then rewinding the tape recording medium, and recording the AV data from one end to the other end of the tape recording medium again.

However, in the recording apparatus using the tape recording medium, it is necessary to rewind the tape recording medium whenever recording the AV data up to the other end of the tape recording medium and thereby, the endless-recording operation of the AV data becomes troublesome.

Therefore, in this type of recording apparatus, by connecting one end and the other end of the recording medium to form the recording medium like a ring, the AV data can be continuously endlessly-recorded in the ring-formed tape recording medium without rewinding the recording medium as described above.

Moreover, in this type of recording apparatus, there is a recording apparatus using a disc recording medium as a recording medium, in which the AV data is continuously endlessly-recorded by repeating the operations of recording the AV data in the AV data recording region of the disc recording medium from the head up to the end of the region and then recording the data in the region from the head up to the end of the region again.

However, in the aforementioned various types of recording apparatuses, the AV data is endlessly-recorded by successively overwriting the AV data returning from the ending point to the starting point of the AV data recording region on the recording medium (tape recording medium or disc recording medium). Therefore, there is a problem that the current recorded AV data is lost because of overwriting if the recording medium goes around and returns. In order to avoid overwriting of the AV data recorded in the recording medium, the recording medium has to be replaced. However, if it takes time to replace the recording medium, the desired AV data can not be recorded.

SUMMARY OF THE INVENTION

In view of the foregoing, and objet of this invention is to provide a recording apparatus and a recording method in which second data can be easily stored while endlessly-recording first data in a recording medium.

The foregoing object and other objects of the invention have been achieved by the provision of a recording apparatus, which comprises a recording means for recording input first data in a recording medium, an input means for inputting a start point and end point of desired second data out of the first data to be recorded or already recorded in the recording medium by the recording means, and a control means, when the start point and end point of the second data are designated through the input means, for controlling the recording means so as to endlessly-record the first data in the recording medium while avoiding the recording region of the recording medium in which the second data has been recorded.

Further, in the present invention, a recording/reproducing apparatus for recording input data in a recording medium capable of non linear access, and reproducing and outputting the recorded data, comprises a recording means for recording input first data in the recording medium, an input means for inputting a start point and end point of desired second data out of the first data to be recorded or already recorded in the recording medium by the recording means, a control means, when the start point and end point of the second data are input through the input means, for controlling the recording means so as to endlessly-record the first data in the recording medium while avoiding the recording region of the recording medium in which the second data has been recorded, and a reproducing means for reproducing and outputting the first data recorded in the recording medium.

Further in the present invention, a recording method for recording input first data in a recording medium capable of non linear access, comprises a first step of endlessly-recording the first data in the recording medium and inputting a start point and/or end point of desired second data out of the first data to be recorded or already recorded in the recording medium, and a second step, when the start point and/or end point of the desired second data are/is input at the first step, of endlessly-recording the first data in the recording medium while avoiding a recording region of the recording medium in which the second data corresponding to the start point and/or end point out of the first data has been recorded.

Furthermore, in the present invention, a recording/reproducing method for recording input data in a recording medium capable of non linear access, and reproducing and outputting the recorded data, comprises a first step of endlessly-recording input first data in the recording medium, and inputting a start point and/or end point of desired second data out of first data to be recorded or already recorded in the recording medium, a second step, when the start point and/or end point of the desired second data are input at first step, of endlessly-recording the first data in the recording medium while avoiding a recording region of the recording medium in which second data corresponding to the start point and/or end point out of the first data has been recorded, and a third step of reproducing and outputting the first data recorded in the recording medium.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
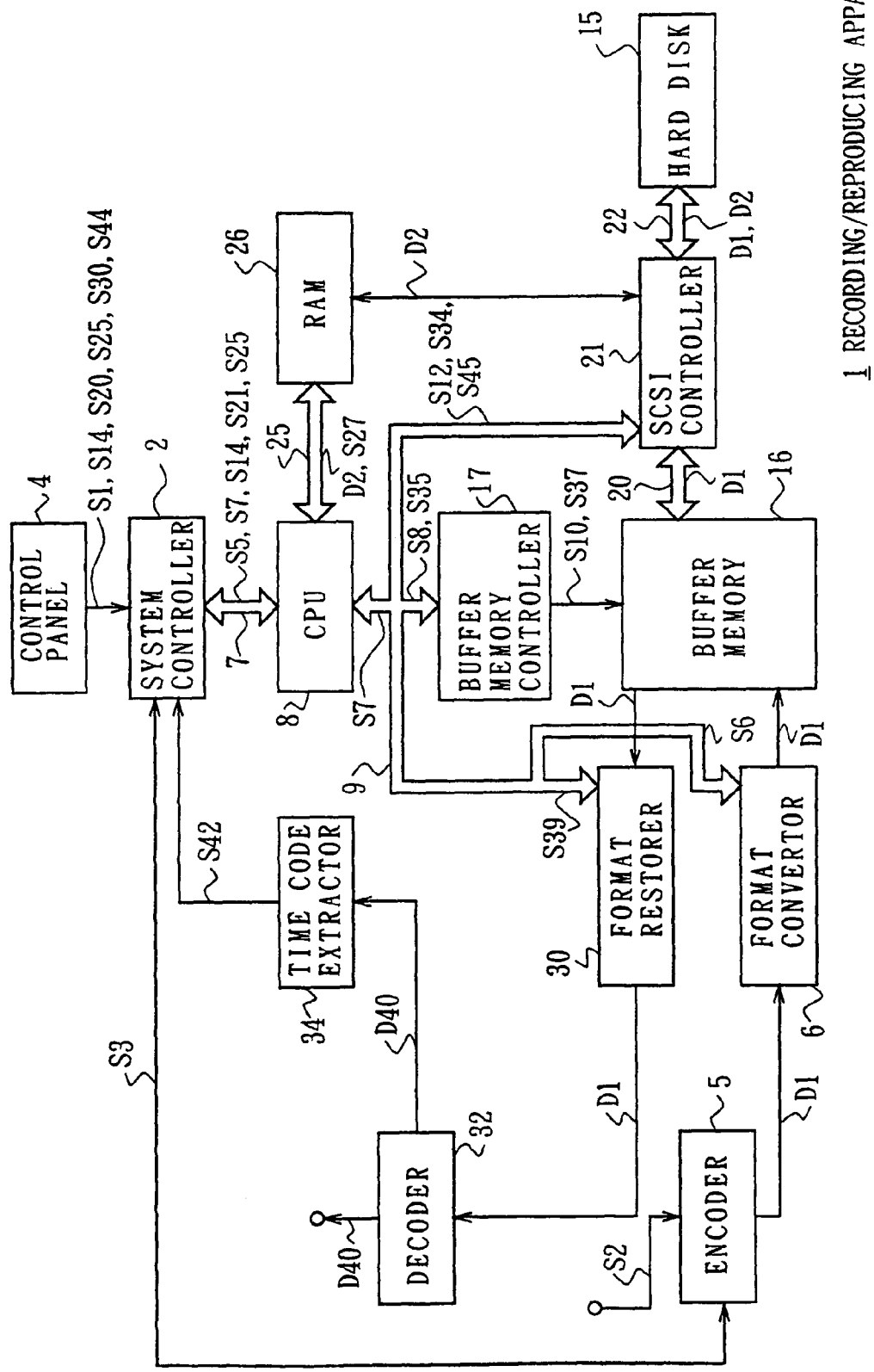
FIG. 1 is a block diagram showing an embodiment of a recording/reproducing apparatus of the present invention.

Preferred embodiments of this invention will be described with reference to the accompanying drawings:

In FIG. 1, symbol 1 denotes a recording/reproducing apparatus as a whole, which is constituted so that a plurality of AV data D1 to be recorded (hereinafter, AV data to be recorded is referred to as first AV data) can be recorded and reproduced and the first AV data D1 can be endlessly-recorded by controlling the whole of the recording/reproducing apparatus by a system controller 2.

First, when the recording/reproducing apparatus 1 records the first AV data D1, a user operates a control panel 4 to designate a recording mode and thereby, a recording mode signal S1 is transmitted to the system controller 2 from the control panel 4.

The system controller 2 supplies a video signal and/or audio signal (hereafter, these signals are referred to as AV signals) S2 corresponding to an image and/or voice to be recorded from the outside to an encoder 5 on the basis of the input recording mode signal S1. In addition, the system controller 2 includes a time code generator (not shown) and transmits a time code (e.g. time information corresponding to 24-hr cycle) generated by the time code generator to the encoder 5 as a time code signal S3.

The encoder 5 adds the time code represented by the time code signal S3 to the input AV signal S2 in order to digitize the signal S2, generates the first AV data D1 by encoding the signal S2, and transmits the first AV data D1 to a format converter 6.

Moreover, in this case, the system controller 2 transmits a recording control signal S5 to a central processing unit (CPU) 8 through a first internal bus 7. Thereby, the CPU 8 is controlled based on the input recording control signal S5 to transmit a data format conversion control signal S6 to the format converter 6 through a second internal bus 9.

Thereby, the format converter 6 successively packets the first AV data D1 for every unit corresponding to the data quantity in a sector of a hard disk 15 to convert the data D1 into a recording format for the hard disk 15, and transmits the data D1 to a buffer memory 16. Note that, the format converter 6 extracts the time codes respectively added to the head position and the tail position of the first AV data D1 when packeting the first AV data D1, and transmits the time codes to the CPU 8 through the second internal bus 9 as time code information signals S7.

In this time, the CPU 8 transmits a buffer control signal S8 for controlling a buffer memory controller 17 to the buffer memory controller 17 through the second internal bus 9.

The buffer memory controller 17 is controlled based on the input buffer control signal S8 to transmit a buffer memory control signal S10 for controlling storage and transmission of the AV data D1 to the buffer memory 16.

Thereby, the buffer memory 16 successively stores the first AV data D1 for every packet on the basis of the input buffer memory control signal S10, and successively transmits the stored first AV data D1 for every packet at a predetermined timing to the hard disk 15 through a first direct memory access (DMA) bus 20, a small computer system interface (SCSI) controller 21, and a second DMA bus 22 in order.

Moreover, the CPU 8 transmits a logical address (LBA: logical block address) of a sector of the hard disk 15 in which the first AV data D1 is recorded for every packet, to the hard disk 15 as a logical address signal S12 through the second internal bus 9, the SCSI controller 21, and the second DMA bus 22 in order. Thereby, the CPU 8 is constituted so as to be capable of successively recording the first AV data D1 in each corresponding sector (corresponding to the logical address) of the hard disk 15 for every packet.

In this time, a file name designated by a user and corresponding to the first AV data D1 is input to the system controller 2 from the control panel 4 as a file name information signal S14 and moreover, the time code information signal S7 is input to the system controller 2 from the CPU 8 through the first internal bus 7. Thereby, the system controller 2 makes the file name of the first AV data D1 which is recorded in the hard disk 15 respectively correspond to the time codes respectively added to the head position and the tail position of the first AV data D1, and records the first AV data D1 in the hard disk 15.

Moreover, the system controller 2 transmits the input file name information signal S14 to the CPU 8 through the first internal bus 7.

Thereby, the CPU 8 generates file data D2 for identifying the first AV data D1 on the basis of the file name information signal S14, the time code information signal S7, and the logical address signal S12. In this connection, the file data D2 comprises the file name corresponding to the first AV data D1, end time of recording of the first AV data D1, a logical address (that is, record entry information) of the head of the recording region of the first AV data D1, size of the first AV data D1 (number of sectors required to record the first AV data D1), and the time code added to the head position of the first AV data D1.

Thus, the CPU 8 is constituted so as to be capable of transmitting thus generated file data D2 to the hard disk 15 through a CPU bus 25, a random access memory (RAM) 26, the SCSI controller 21, and the second DMA bus 22 in order and recording the file data D2 in the hard disk 15.

Therefore, in the recording/reproducing apparatus 1, when the first AV data D1 is recorded, a plurality of first AV data D1 and a plurality of file data D2 for identifying the first AV data D1 can be recorded by repeating a series of aforementioned operations when recording the first AV data D1.

Figure 2:
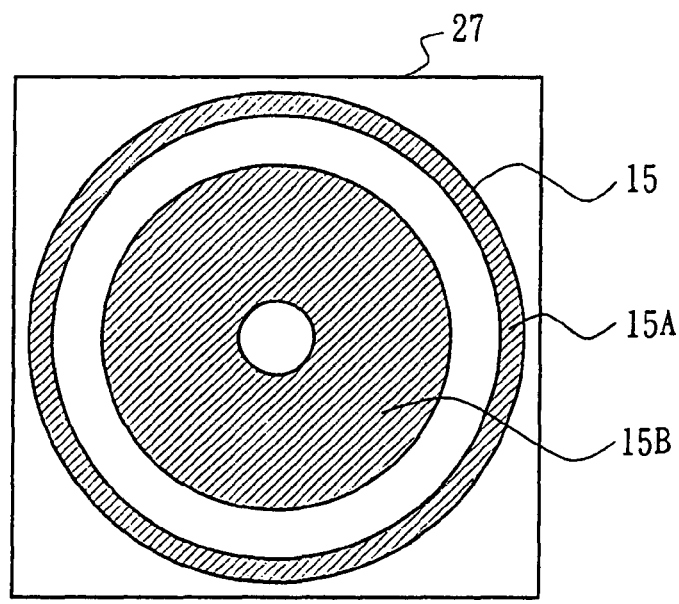
FIG. 2 is a schematic diagram showing the structure of a hard disk.

The hard disk 15, as shown in FIG. 2, is formed into a disc shape and set in a predetermined case 27 and for example, a file data recording region 15A is formed along the outermost track of the hard disk 15 and moreover, an AV data recording region 15B is formed inside of the AV data recording region 15A. In the example shown in FIG. 2, the file data recording region 15A is formed on the outermost track and the file data recording region 15B is formed on the inside track. However, the file data recording region 15A may be formed on the inside track of the hard disk 15 and the AV data recording region 15B may be formed on the outside track. Further, recording regions may be respectively formed on predetermined regions. Thus, the hard disk 15 can record a plurality of file data D2 in the file data recording region 15A and moreover record a plurality of first AV data D1 in the AV data recording region 15B.

Figures 3A, 3B:
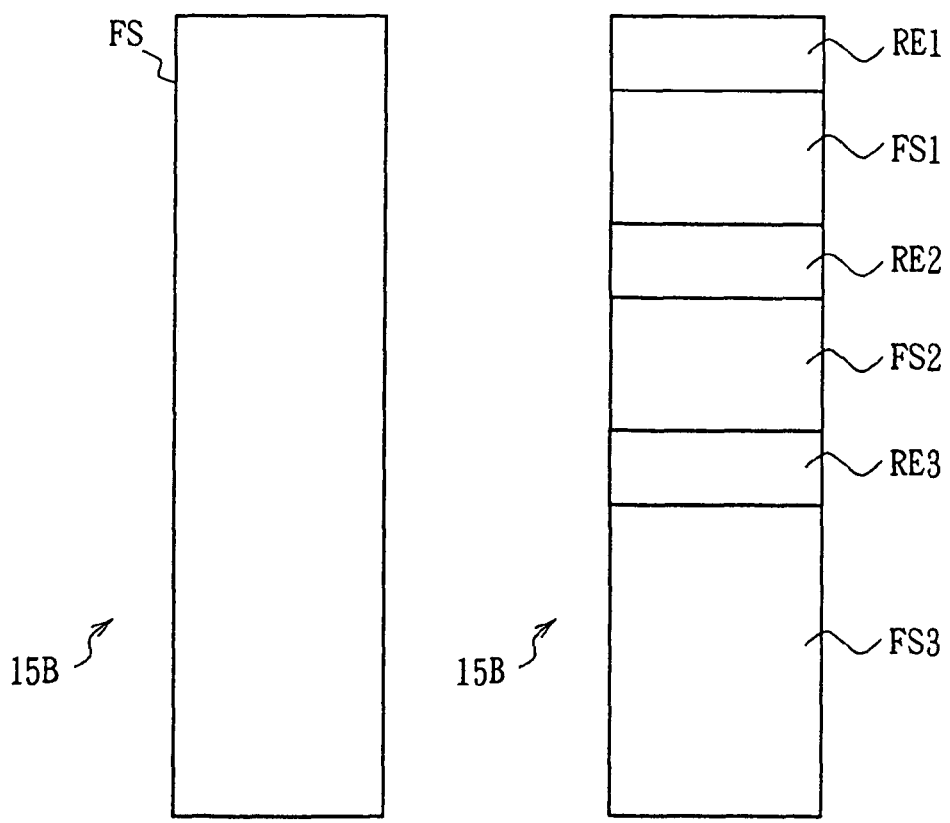
FIGS. 3A and 3B are schematic diagrams explaining recording of first AV data in an AV data recording area of the hard disk.

Moreover, as shown in FIG. 3A, the whole of the AV data recording region 15B of the hard disk 15 serves as a first recording region FS until the first AV data D1 is recorded correspondingly to the file data D2. That is, when nothing is recorded in the AV data recording region 15B, the whole of the AV data recording region 15B is a free space (FS) as shown in FIG. 3A. When the first AV data D1 respectively corresponding to a plurality of file data D2 are recorded in the AV data recording region 15B of the hard disk 15, as shown in FIG. 3B, the AV data D1 based on the file data D2 are respectively recorded in the second recording regions RE1, RE2, and RE3 on the basis of the logical address (record entry) information of the head of the recording region, in which the AV data D1 is recorded, in the file data D2.

On the other hand, in the recording/reproducing apparatus 1 shown in FIG. 1, when the first AV data D1 is reproduced, a user operates the control panel 4 to designate the reproduction mode and thereby, a reproduction mode signal S20 is transmitted to the system controller 2 from the control panel 4. The system controller 2 transmits a file data read control signal S21 to the CPU 8 through the first internal bus 7 on the basis of the input reproduction mode signal S20. The CPU 8 controls the hard disk 15 on the basis of the input file data read control signal S21 to read all the file data D2 recorded in the hard disk 15 from the hard disk 15 to the RAM 26 through the second DMA bus 22 and the SCSI controller 21 in order.

Under the above state, the user operates the control panel 4 to designate a file name corresponding to desired first AV data D1 (that is, first AV data D1 corresponding to a desired image and/or voice to be reproduced) and thereby, the control panel 4 transmits a file name designation signal S25 to the system controller 2.

The system controller 2 reads a time code corresponding to the designated file name from a recording medium in the system controller 2 on the basis of the input file name designation signal S25 and transmits the file name designation signal S25 to the CPU 8 through the first internal bus 7.

The CPU 8 transmits a retrieval signal S27 to the RAM 26 on the basis of the input file name designation signal S25. Thereby, the CPU 8 retrieves the file names of a plurality of file data D2 stored in the RAM 26 to read file data D2 having a file name designated by the user.

In this time, the user operates the control panel 4 again to designate a reproduction start time for a desired first AV data value D1 (time from the head position of the first AV data D1 up to start of reproduction). The control panel 4 transmits a reproduction start signal S30 representing the designated reproduction start time to the system controller 2.

The system controller 2 selects the time code of first AV data D1 corresponding to the reproduction start time represented by the reproduction time signal S30 on the basis of the time codes of the head position and tail position of the desired first AV data D1 to transmit the selected time code to the CPU 8 through the first internal bus 7 as a time code signal S31.

The CPU 8, on the basis of the time code (time code of starting reproduction) represented by the input time code signal S31 and the logical address of the head of the recording region of the first AV data D1 stored in the file data D2 having a file name designated by the user, computes a logical address for starting the reproduction of the first AV data value D1 corresponding to the time code, and then transmits thus obtained logical address and the logical address for every packet up to the tail of the first AV data D1 to the hard disk 15 as logical address signals S34 through the second internal bus 9, the SCSI controller 21, and the second DMA bus 22 in order. Thereby, the CPU 8 successively reproduces the desired AV data D1 recorded in the hard disk 15, for every packet to transmit the data D1 to the buffer memory 16 through the second DMA bus 22, the SCSI controller 21, and the first DMA bus 20 in order.

In this time, the CPU 8 transmits a buffer control signal S35 for controlling the buffer memory controller 17 to the buffer memory controller 17 through the second internal bus 9.

The buffer memory controller 17 is controlled based on the input buffer control signal S35 to transmit a buffer memory control signal S37 for controlling storage and transmission of the first AV data D1 to the buffer memory 16.

Thereby, the buffer memory 16 successively stores the first AV data D1 for every packet on the basis of the input buffer memory control signal S37 and successively transmits the stored first AV data D1 to a format restorer 30 for every packet at a predetermined timing.

In this case, a data format restoration control signal S39 is input together with the first AV data D1 to the format restorer 30 from the CPU 8 through the second internal bus 9. Thereby, the format restorer 30 restores the input and packeted first AV data D1 on the basis of the data format restoration control signal S39 (that is, the first AV data D1 is returned to the format before packeted) and transmits the data D1 to a decoder 32.

The decoder 32 generates an AV signal S40 from the input first AV data D1, and then transmits the AV signal S40 to external units (e.g. predetermined display unit and speaker) and also to a time code extractor 34.

The time code extractor 34 extracts a time code attached to the input AV signal S40 from the signal S40 and transmits the time code to the system controller 2 as an extracted time code signal S42.

Thus, in the recording/reproducing apparatus 1, when the first AV data D1 is reproduced, images and/or voices corresponding to desired first AV data D1 can be reproduced from a desired position by repeating the aforementioned series of operations.

In this case, in the recording/reproducing apparatus 1, a user operates the control panel 4 to designate the endless-recording mode when endlessly-recording the first AV data D1. Thereby, an endless-recording mode signal S44 is transmitted to the system controller 2 from the control panel 4, and the system controller 2 controls the whole of the apparatus on the basis of the input endless-recording mode signal S44 to supply the AV signal S2 to the encoder 5 from an external unit and moreover transmit the time code signal S3 to the encoder 5 from the internal time code generator.

The encoder 5 adds a time code represented by the time code signal S3 to the input AV signal S2 to encode the signal S2. Thereby, the encoder generates the first AV data D1 to transmit the first AV data D1 to the format converter 6.

The format converter 6 converts the first AV data D1 into a recording format for the hard disk 15 by successively packeting the first AV data D1 every unit corresponding to the data quantity of a sector of the hard disk 15 on the basis of the data format conversion control signal S6 input from the CPU 8 in order to transmit the format to the buffer memory 16 and moreover, extracts the time codes respectively added to the head position and the tail position of the first AV data D1 and transmits them to the CPU 8 through the second internal bus 9 as the time code information signal S7.

The CPU 8 transmits the buffer control signal S8 to the buffer memory controller 17 through the second internal bus 9. Then, the buffer memory controller 17 transmits the buffer memory control signal S10 to the buffer memory 16 on the basis of the input buffer control signal S8.

The buffer memory 16 successively stores the first AV data D1 for every packet on the basis of the input buffer memory control signal S10 and successively transmits the stored first AV data D1 to the hard disk 15 for every packet at a predetermined timing through the first DMA bus 20, the SCSI controller 21, and the second DMA bus 22 in order.

In this case, the CPU 8 under endless recording is constituted so as to endlessly-record the first AV data D1 only in first recording regions FS1 to FS3 of the AV data recording region 15B of the hard disk 15 (FIG. 3B) (that is, so as to avoid the second recording regions RE1 to RE3 (FIG. 3B) in which the AV data D1 is recorded correspondingly to the file data D2). Therefore, the CPU 8 successively transmits a logical address for each sector, from the sector located at the head of the first recording region FS1 (FIG. 3B) of the AV data recording region 15B of the hard disk 15 while successively avoiding the second recording region RE1 to RE3 (FIG. 3B) up to the sector located at the tail of the first recording region FS3 (FIG. 3B), to the hard disk 15 as a logical address signal S45 through the second internal bus 9, the SCSI controller 21, and the second DMA bus 22 in order and then, repeatedly transmits the logical address signal S45 to the hard disk 15. Therefore, the CPU 8 is constituted so as to be capable of endlessly-recording a plurality of first AV data D1 only in the first recording regions FS1 to FS3 (FIG. 3B) of the AV data recording region 15B of the hard disk 15.

Figure 4:
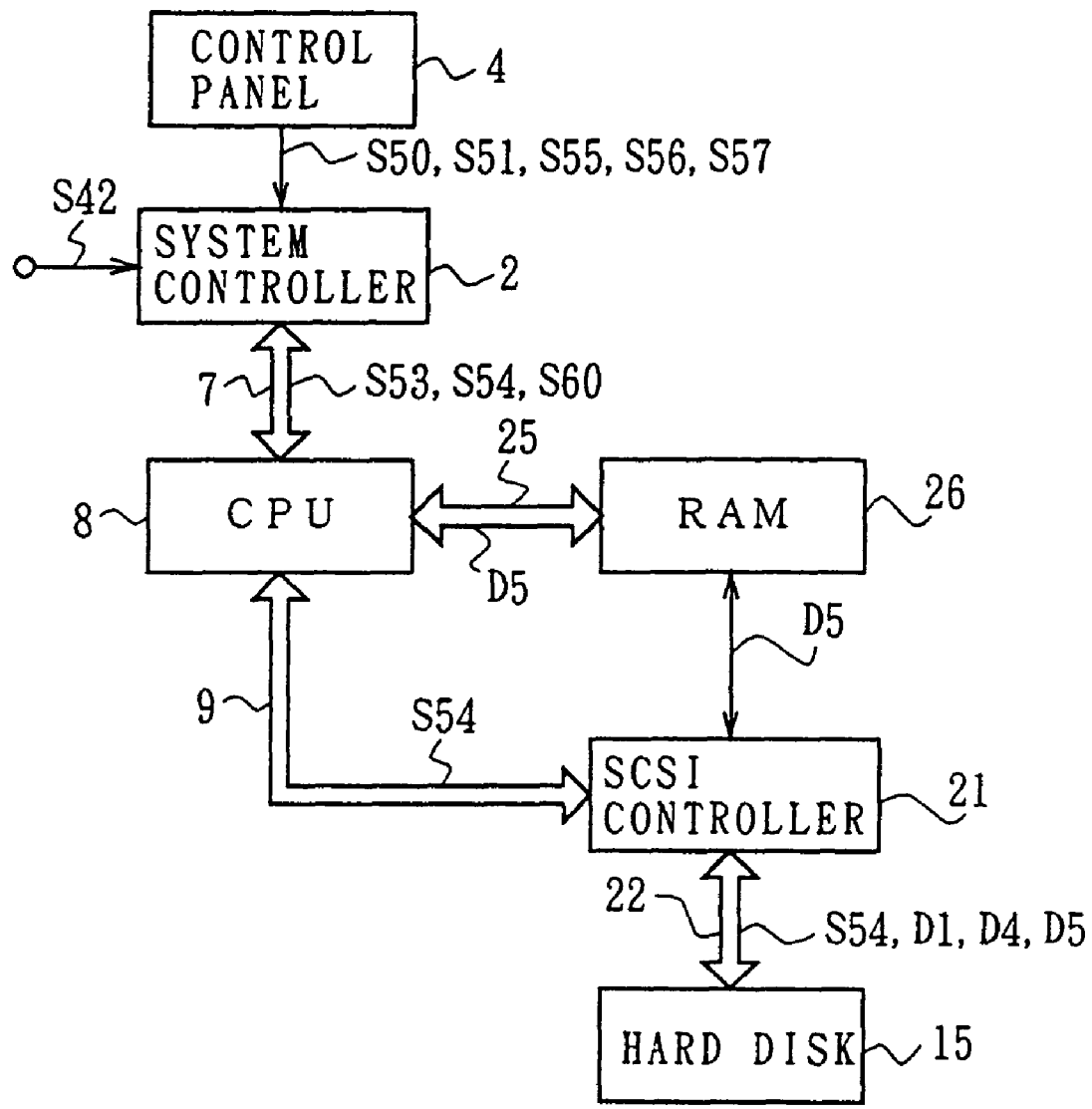
FIG. 4 is a schematic diagram explaining storage of second AV data in the AV data recording region of the hard disk.

Under the above state, as shown in FIG. 4 in which portions corresponding to those in FIG. 1 are provided with the same symbol, in the recording/reproducing apparatus 1, a user operates the control panel 4 to designate a file name corresponding to desired second AV data D4 out of the first AV data D1 and thereby, a file name signal S50 representing the file name is transmitted to the system controller 2 from the control panel 4.

In this case, the system controller 2 records the file name represented by the input file name signal S50 in the recording medium.

In addition, in the recording/reproducing apparatus 1, the user operates the control panel 4 to designate the reproduction of the first recording regions FS1 to FS3 (FIG. 3B) of the AV data recording region 15B of the hard disk 15 and thereby, a reproduction designation signal S51 is transmitted to the system controller 2 from the control panel 4.

The system controller 2 transmits a reproduction start signal S53 for controlling the CPU 8 to the CPU 8 through the first internal bus 7 on the basis of the input reproduction designation signal S51.

Thereby, the CPU 8 is controlled based on the input reproduction start signal S53 to successively reproduce the first AV data D1 endlessly-recorded in the first recording regions FS1 to FS3 (FIG. 3B) of the AV data recording region 15B of the hard disk 15, in recorded order after a predetermined time. Further, the CPU 8 repeatedly transmits the logical address as a logical address signal S54 for every sector to the hard disk 15 through the second internal bus 9, the SCSI controller 21, and the second DMA bus 22 in order.

Thus, the CPU 8 endlessly-records a plurality of first AV data D1 in the first recording regions FS1 to FS3 (FIG. 3B) of the AV data recording regions 15B of the hard disk 15 and at the same time, successively reproduces the recorded fist AV data D1 without overlapping with the first AV data D1 to be endlessly-recorded and transmits the recorded first AV data D1 to the buffer memory 16 through the second DMA bus 22, the SCSI controller 21, and the first DMA bus 20 in order.

Moreover, the CPU 8 transmits the logical address signal S54 transmitted to the hard disk 15, also to the system controller 2.

Thus, the recording/reproducing apparatus 1 transmits the first AV data D1 of the first recording region reproduced from the hard disk 15, to the decoder 32 by the same processing as the case when reproducing the aforementioned first AV data D1. The decoder 32 converts the input first AV data D1 of the first recording region into analog data and transmits the data to external units and also to the time code extractor 34.

The time code extractor 34 extracts a time code from the input AV signal S40 and transmits the time code to the system controller 2 as the extracted time code signal S42.

In this case, a predetermined display unit and a speaker are connected to the output side of the decoder 32, therefore the recording/reproducing apparatus 1 allows a user to look at and/or listen to images and/or voices corresponding to the AV signal S40 transmitted from the decoder 32, through the display unit and/or the speaker.

Under the above state, the recording/reproducing apparatus 1 allows the user to look at and/or listen to the images and/or voices and recognize the contents. When reproduction of a desired image and/or voice is started, the recording/reproducing apparatus 1 allows the user to operate the control panel 4 and designate the start point. In this time, a start point signal S55 representing that the start point is designated is input to the system controller 2 from the control panel 4 and thereby, the logical address and the time code input simultaneously with the start point signal S55 (that is, when the user designates the start point) are recorded in the recording medium.

The recording/reproducing apparatus 1 allows the user to look at and/or listen to a desired image and/or voice and recognize the contents. When reproduction of the desired image and/or voice ends, the recording/reproducing apparatus 1 allows the user to operate the control panel 4 and designate the end point. In this time, an end point signal S56 representing that the end point is designated is input to the system controller 2 from the control panel 4 and thereby, the logical address and the time code input simultaneously with the end point signal S56 (that is, when the user designates the end point) are recorded in the recording medium.

Thereby, the user operates the control panel to designate the execution of storage of the second AV data D4 corresponding the desired image and voice of which the start point and end point are designated, and thereby a storage execution signal S57 is input from the control panel. The system controller 2, on the basis of the storage execution signal S57, reads the file name corresponding to the second AV data. D1, the logical address and time code when the start point is designated, and the logical address and time code when the end point is designated from the recording medium in accordance with a storage execution signal S57, and transmits them to the CPU 8 as file data generation information signals S60 through the first internal bus 7.

The CPU 8 generates file data D5 for identifying the second AV data D4 corresponding to the desired image and/or voice of which start and end points are designated, on the basis of the input file data generation information signal S60, transmits the data D5 to the hard disk 15 through the CPU bus 25, the RAM 26, the SCSI controller 21, and the second DMA bus 22 in order, and records the file data D5 in the file data recording region 15A of the hard disk 15.

Figure 5A:
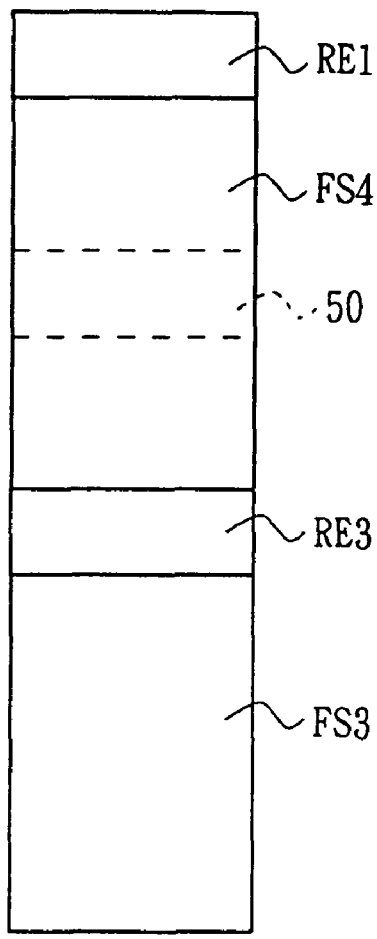
FIGS. 5A and 5B are block diagrams explaining endless recording of the first AV data.
Figure 5B:
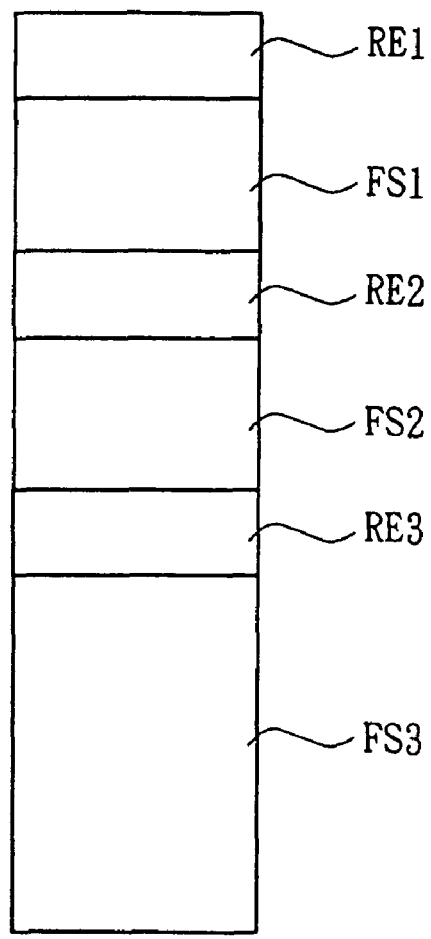

Thereby, as shown in FIGS. 5A and 5B in which portions corresponding to those in FIGS. 3A and 3B are provided with the same symbol, the recording/reproducing apparatus 1, while avoiding a predetermined region 50 (FIG. 5A), in which the second AV data D4 of which start and end points are designated is recorded out of a plurality of the first AV data D1 recorded in the first recording region FS4 of the AV data recording region 15B in the hard disk 15, is constituted so as to store the second AV data D4 recorded in a second recording region RE2 (FIG. 5B) with the predetermined region 50 as the second recording region RE2 in which the first AV data D1 is endlessly-recorded.

Figure 6:
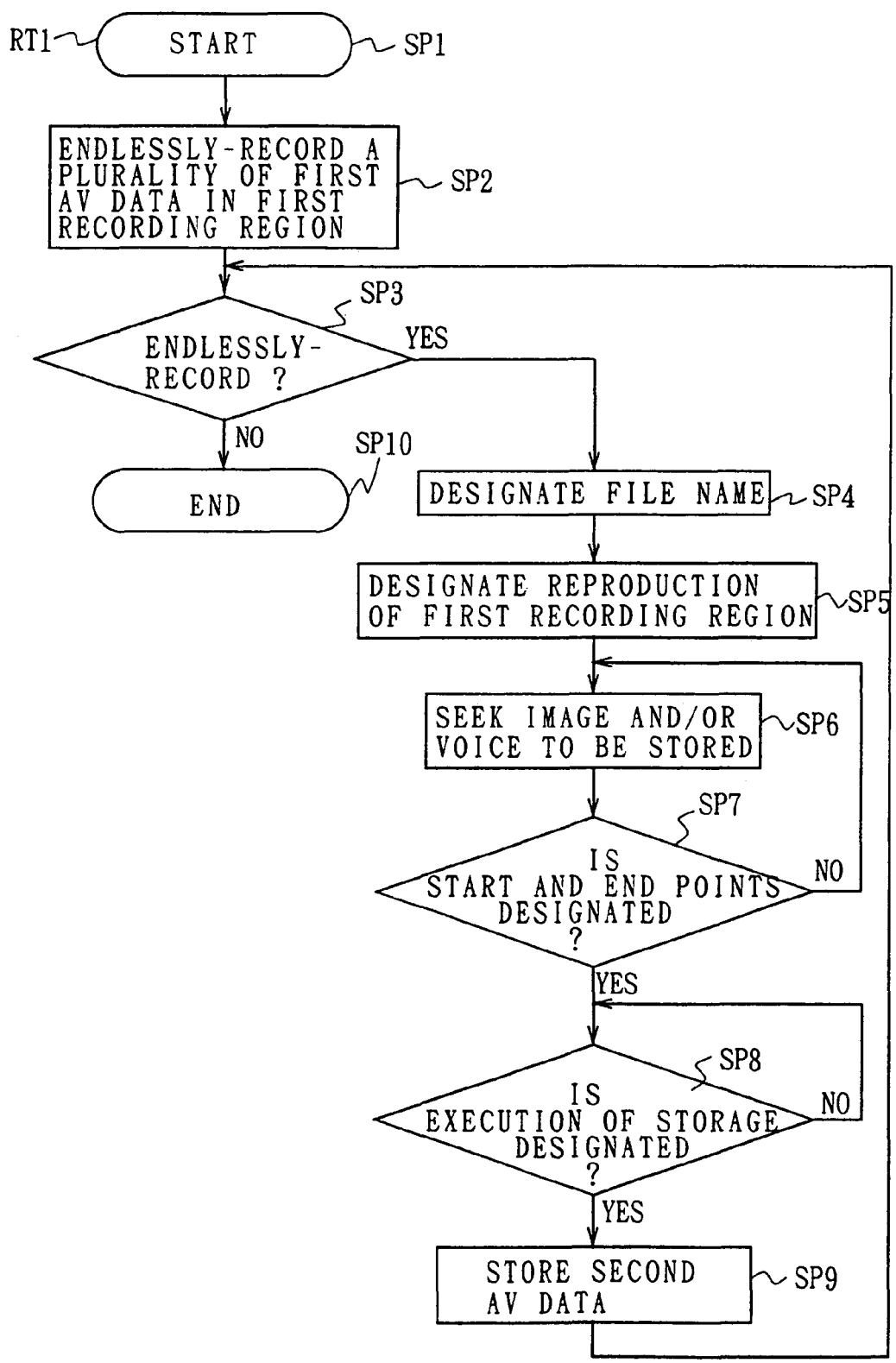
FIG. 6 is a flow chart showing an endless recording procedure.

In the aforementioned configuration, in the recording/reproducing apparatus 1, when a user operates the control panel 4 to designate an endless-recording mode, the system controller 2 starts an endless-recording procedure RT1 shown in FIG. 6, proceeds from step SP1 to step SP2, and controls the CPU 8 to endlessly-record a plurality of first AV data D1 in the first recording region of the AV data recording region 15B of the hard disk 15.

Then, the system controller 2 proceeds to step SP3 and judges whether or not the first AV data D1 is endlessly-recorded. When an affirmative result is obtained, the system controller 2 proceeds to the following step SP4 to record a file name corresponding to the second AV data D4 designated by operating the control panel 4 by the user.

Thereafter, the system controller 2 proceeds to step SP5. When the user operates the control panel 4 to designate the reproduction of the first recording region of the AV data recording region 15B of the hard disk 15, the controller 2 controls the CPU 8 to successively reproduce the first AV data D1 recorded in the first recording region of the AV data recording region 15B of the hard disk 15.

Then, the system controller 2 proceeds to step SP6, allows the user to look at and/or listen to the contents of images and/or voices corresponding to the first AV data D1 obtained from the first recording region through the display unit and/or speaker and thereby, allows the user to recognize the contents of the images and/or voices and search a desired image and/or voice.

Then, the system controller 2 proceeds to step SP7, judges whether or not the start and end points corresponding to the desired image and/or voice are designated by recognizing the desired image and/or voice and operating the control panel 4 by the user. When a negative result is obtained, the system controller 2 returns to step SP6 and thereafter, repeats a loop of steps SP6 to SP7 until an affirmative result is obtained at step SP7.

Then, when an affirmative result is obtained at step SP7, the system controller 2 judges at step SP8 whether or not execution of storage of the second AV data D4 corresponding to the desired image and/or voice of which start and end points are designated is designated by operating the control panel 4 by the user. When a negative result is obtained, the system controller 2 repeats step SP8 until an affirmative result is obtained.

Thereafter, when an affirmative result is obtained at step SP8, the system controller 2 proceeds to the following step SP9, transmits the file name corresponding to the second AV data D4 and the logical address and time code when the start and end points are designated to the CPU 8 as file data generation information signals S60. Then, the CPU 8 generate file data D5 on the basis of the file data generation information signals S60, and the file data D5 is recorded in the file data recording region 15A of the hard disk 15. Thereby, the system controller 2 stores the second AV data D4 recorded in the first recording region of the AV data recording region 15B and thereafter, returns to step SP3.

In this way, the system controller 2 repeats a loop of SP3-SP4-SP5-SP6-SP7-SP8-SP9-SP3 while endlessly-recording the first AV data D1 until a negative result is obtained at step SP3, and when the second AV data D4 is recorded together with a plurality of endlessly-recorded first AV data values D1, successively stores the second AV data D4.

Thereafter, when a negative result is obtained at step SP3, the system controller 2 judges that endless-recording of the first AV data D1 finishes and proceeds to the following step SP10 to complete the endless-recording procedure RT1.

Therefore, the recording/reproducing apparatus 1 comprises the CPU 8 for endlessly-recording a plurality of first AV data D1 in the first recording region of the AV data recording region 15B of the hard disk 15 and moreover successively reproducing the recorded first AV data D1, the control panel 4, when a desired image and/or voice are/is reproduced out of images and/or voices corresponding to the reproduced first AV data D1, for inputting the start and end points of the desired image and/or voice, and the system controller 2 for controlling the CPU 8 so as to endlessly-record a plurality of first AV data D1 in the first recording region of the AV data recording region 15B of the hard disk 15 on the basis of the start and end points while avoiding the recording region for the second AV data D4 corresponding to the desired image and/or voice. Thereby, it is possible to store the second AV data D4 together with the first AV data D1 without replacing the hard disk 15 even if the second AV data D4 is endlessly-recorded in the first recording region of the AV data recording region 15B of the hard disk 15.

In addition, the recording/reproducing apparatus 1 makes it possible to store the second AV data D4 while endlessly-recording the first AV data D1 without changing the structure of the AV data recording region 15B of the hard disk 15.

On the other hand, in a recording method using the recording/reproducing apparatus 1, the first AV data D1 recorded in the first recording region of the AV data recording region 15B of the hard disk 15 is reproduced while endlessly-recording a plurality of first AV data D1 in the first recording region, a user looks at, listens to, and recognizes the contents of images and/or voices corresponding to the reproduced first AV data D1 and then designates the start and end points of a desired image and/or voice when the desired image and/or voice are/is reproduced, and the first AV data D1 is endlessly-recorded on the basis of the designated start and end points while avoiding the recording region for the second AV data D4 corresponding to the desired image and/or voice in the first recording region of the AV data recording region 15B of the hard disk 15. Thereby, the second AV data D4 can be easily stored without replacing the hard disk 15 (that is, a recording medium).

Further, in the recording method, a plurality of first AV data D1 is endlessly-recorded in the first recording region of the AV data recording region 15B of the hard disk 15 and moreover the first AV data D1 recorded in the first recording region is reproduced, and then a user looks at, listens to, and recognizes the contents images and/or voices corresponding to the reproduced first AV data D1 to designate the start point and end point of a desired image and/or voice when the desired image and/or voice are/is reproduced, Thereby, the desired image and/or voice can be easily selected.

Furthermore, in the recording method, the AV first data D1 is reproduced after a predetermined time when a plurality of first AV data D1 is endlessly-recorded in the first recording region 15B of the hard disk 15. Thereby, it can prevent endlessly-recorded first AV data D1 and first AV data D1 to be reproduced from overlapping each other and store second AV data D4 before new first or second AV data D1 or D4 is overwritten on the previously-recorded second AV data D4.

The above structure comprises the CPU 8 for endlessly-recording a plurality of first AV data D1 in the first recording region of the AV data recording region 15B of the hard disk 15 and successively reproducing the endlessly-recorded first AV data D1, the control panel 4 for inputting the start and end points of a desired image and/or voice corresponding to the second AV data D4 out of images and/or voices corresponding to the first AV data D1 reproduced by the CPU 8, and the system controller 2 for controlling the CPU 8 so as to endlessly-record a plurality of first AV data D1 in the first recording region of the AV data recording region 15B of the hard disk 15 on the basis of the designated start and end points while avoiding the recording region for the second AV data D4. Thereby, it is possible to store the second AV data D4 without replacing the hard disk 15 even when endlessly-recording the second AV data D4 together with the first AV data D1 in the first recording region of the AV data recording region 15B of the hard disk 15 and thus, realize a recording apparatus capable of easily storing desired second AV data D4 while endlessly-recording the first AV data D1.

Moreover, it is possible to store the second AV data D4 without replacing the hard disk 15 because of endlessly-recording a plurality of first AV data D1 in the first recording region of the AV data recording region 15B of the hard disk 15, successively reproducing the endlessly-recorded first AV data D1 to designate the start and end points of a desired image and/or voice corresponding to the second AV data D4 out of images and/or voices corresponding to the first AV data D1 and then, endlessly-recording the first AV data values D1 in the first recording region of the AV data recording region 15B of the hard disk 15 on the basis of the designated start and end points while avoiding the recording region for the second AV data D4. Thus, it is possible to realize a recording method capable of easily storing desired second AV data D4 while endlessly-recording the first AV data D1.

Note that, while in the aforementioned embodiment, the hard disk 15 is used as a recording medium for endlessly-recording first AV data D1, however, the present invention is not limited thereto and various recording mediums; a recording medium capable of non linear access such as a disc recording medium and a memory other than the hard disk 15 can be used.

Further, while in the aforementioned embodiment, a plurality of first AV data D1 is endlessly-recorded in a hard disk 15 and moreover the first AV data is reproduced, and a user recognizes the contents of images and/or voices corresponding to the first AV data D1 to designate the start point and end point of a desired image and/or voice. However, the present invention is not limited thereto and it is also possible to allow a user to recognize the contents of images and/or voices corresponding to first data to designate the start point and end point of second AV data D4 corresponding to a desired image and/or voice before endlessly-recording first AV data D1 and thereafter, generate file data D5 for recognizing the second AV data D4 to record the file data D5 together with the second AV data D4 in the hard disk 15 while endlessly-recording the first AV data D1 in the hard disk 15. Thereby, it is possible to apply a recording/reproducing apparatus of the present invention to various types of recording/reproducing apparatuses such as a cam coder and improve the versatility of the recording/reproducing apparatus.

Further, while in the aforementioned embodiment, first and second AV data D1 and D4 comprising images and/or voices are used as data to be endlessly-recorded in a recording medium, however, the present invention is not limited thereto and various types of data such as data showing characters can be used.

Furthermore, while in the aforementioned embodiment, a plurality of first AV data D1 are successively reproduced in recorded order of the data after a predetermined time when the first AV data D1 has been endlessly-recorded in the first recording regions FS1 to FS3 (FIG. 3B) of the AV data recording region 15B of the hard disk 15. However, the present invention is not limited thereto and it is possible to start the endless-recording and reproducing of the first AV data D1 in the first recording regions FS1 to FS3 from any logical address as long as the first AV data D1 to be endlessly-recorded is not overlapped with the first AV data D1 to be reproduced in the recording regions FS1 to FS3 of the AV data recording region 15B of the hard disk 15 and the first AV data D1 can be reproduced before any data is overwritten on the first AV data D1.

Furthermore, while in the aforementioned embodiment, the control panel 4 is used as input means for inputting the start and end points of desired second data D4 out of first data D1 to be recorded or already recorded in the recording medium 15 by recording means 8. However, the present invention is not limited thereto and any other input means can be used such as a user interface, as long as the start and end points of desired second data D4 can be input out of first data D1 to be recorded or already recorded in the recording medium 15 by the recording means 8.

Furthermore, while in the aforementioned embodiment, the system controller 2 is used as control means for controlling the recording means 8, when the start and end points of second data D4 are designated through input means 4, so as to endlessly-record first data D1 in the recording medium 15 while avoiding the recording region of the recording medium 15 in which the second AV data D4 has been recorded. However, the present invention is not limited thereto and any other control means can be used as long as, when the start and end points of the second data D4 are designated through the input means 4, the recording means 8 can be controlled so as to endlessly-record the first data D1 in the recording medium 15 while avoiding the recording region of the recording medium 15 in which the second data D4 has been recorded.

Furthermore, while in the aforementioned embodiment, a display unit and speaker are used as recognition means for allowing a user to recognize the contents of first data D1 and second data D4 reproduced by regeneration means 8. However, the present invention is not limited thereto and any other recognition means can be used as long as a user can recognize the contents of the first data D1 and second data D4 reproduced by the regeneration means 8.

As described above, the present invention comprises recording means for endlessly-recording successively-input first data in a recording medium, input means for inputting the start and end points of desired second data out of first data to be recorded or already recorded in the recording medium by the recording means, and control means, when the start and end points of second data through the input means, for controlling the recording means so as to endlessly-record the first data in the recording medium while avoiding the recording region of the recording medium in which the second data has been recorded. Therefore, the second data is endlessly-recorded together with the first data without replacing the recording medium and moreover the second data can be stored. Thus, it is possible to realize a recording apparatus capable of easily storing the second data while endlessly-recording the first data in the recording medium.

Further, while successively-input first data are endlessly-recorded in a recording medium, the start and end points of desired second data are recorded out of the first data to be recorded or already recorded in the recording medium when the start and end points of the desired second data are designated, and then the first data are endlessly-recorded in the recording medium on the basis of the recorded start and end points while avoiding the recording region of the recording medium in which the second data is recorded. Thereby, the second data can be stored without replacing the recording medium. Thus, it is possible to realize a recording method capable of easily storing the second data while endlessly-recording the first data in the recording medium.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A recording apparatus comprising:
an input device;
a processor;
a first memory device; and
a second memory device storing instructions which when executed by the processor, cause the processor to operate with the input device to:
(a) endlessly-record an audio and/or video data set, said audio and/or video data set being endlessly-recorded only in a first recording region of a recording medium;
(b) reproduce the endlessly-recorded audio and/or video data set;
(c) enable a user to search the endlessly-recorded audio and/or video data set;
(d) thereafter, enable the user to designate an audio and/or video data subset by setting a subset start point and a subset end point within the endlessly-recorded audio and/or video data set;
(e) cause the first memory device to store the designated audio and/or video data subset, the stored designated audio and/or video data subset being previously endlessly-recorded in the first recording region of the recording medium;
(f) thereafter, record said stored designated audio and/or video data subset only in a second recording region of the recording medium, the second recording region of the recording medium being separate from the first recording region of the recording medium;
(g) generate a file data set to identify said designated audio and/or video data subset;
(h) record said generated file data only in the second recording area of the recording medium, wherein:
(i) said file data set is used to process said designated audio and/or video data subset; and
(ii) said file data set is used so that said designated audio and/or video data subset is not overwritten.

2. The recording apparatus of claim 1, wherein when executed by the processor, the instructions cause the processor to, using the file data set, endlessly-record over said audio and/or video data set but for a recording region corresponding to said designated audio and/or video data subset.

3. The recording apparatus of claim 1, wherein said recording medium is a disc recording medium.

4. The recording apparatus of claim 3, wherein when executed by the processor, the instructions cause the processor to record:
(a) said file data set in an outer track of said disc recording medium; and
(b) said audio and/or video data set in an inner track of said disc recording medium.

5. The recording apparatus of claim 3, wherein when executed by the processor, the instructions cause the processor to record:
(a) said file data set in an inner track of said disc recording medium; and
(b) said audio and/or video data set in an outer track of said disc recording medium.

6. The recording apparatus of claim 1, wherein said file data set includes a logical address.

7. The recording apparatus of claim 1, wherein said file data set includes a file name.

8. The recording apparatus of claim 1, wherein said file data set includes a time code.

9. The recording apparatus of claim 1, wherein said file data set includes a data size.

10. The recording apparatus of claim 1, wherein said file data set includes end time of recording.

11. The recording apparatus of claim 1, wherein when executed by the processor, the instructions cause the processor to record said audio and/or video data subset according to said file data set.

12. The recording apparatus of claim 1, which includes a time code extractor configured to extract a time code from said audio and/or video data set.

13. The recording apparatus of claim 1, wherein said recording medium is capable of non-linear access.

14. The recording apparatus of claim 13, wherein said recording medium is a disc recording medium.

15. The recording apparatus of claim 14, wherein said disc recording medium is a hard disc.

16. The recording apparatus of claim 13, wherein when executed by the processor, the instructions cause the processor to record said audio and/or video data set in a memory.

17. The recording apparatus of claim 1, wherein when executed by the processor, the instructions cause the processor to generate a second file data set to identify said audio and/or video data set.

18. The recording apparatus of claim 17, wherein said second file data set includes at least one of:
(a) a file name corresponding to the audio and/or video data set;
(b) a logical address of the audio and/or video data set;
(c) a size of the audio and/or video data set; and
(d) a time code of the audio and/or video data set.

19. The recording apparatus of claim 1, wherein said audio and/or video data subset designated by said user interface is data to be recorded on a disk recording medium.

20. The recording apparatus of claim 1, wherein said audio and/or data subset includes a plurality of images recognizable by a user.

21. A method of operating a recording apparatus for recording audio and/or video data, the recording apparatus including instructions, the method comprising:
(a) causing a processor to execute the instructions to endlessly-record an audio and/or video data set, said audio and/or video data set being endlessly-recorded only in a first recording region of a recording medium;
(b) causing the processor to execute the instructions to reproduce the endlessly-recorded audio and/or video data set;
(c) enabling a user to search the endlessly-recorded audio and/or video data set;
(d) thereafter, enabling the user to designate an audio and/or video data subset by setting a subset start point and a subset end point within said endlessly-recorded audio and/or video data set;
(e) causing the processor to execute the instructions to cause a memory device to store the designated audio and/or video data subset, the stored designated audio and/or video data subset being previously endlessly-recorded in the first recording region of the recording medium;
(f) thereafter, causing the processor to execute the instructions to record said stored designated audio and/or video data subset only in a second recording region of the recording medium, the second recording region of the recording medium being separate from the first recording region of the recording medium;

(g) causing the processor to execute the instructions to generate a file data set identifying said designated audio and/or video data subset;

(h) causing the processor to execute the instructions to record said generated file data only in the second recording area of the recording medium; and (i) causing the processor to execute the instructions to process said designated audio and/or video data subset using said file data set, wherein said file data set is used so that the designated audio and/or video data subset is not overwritten.

22. The method of claim 21, which includes continuously overwriting the audio and/or video data set but for said designated audio and/or video data subset.

23. The method of claim 21, wherein said recording medium is a disc recording medium.

24. The method of claim 23, which includes:
(a) recording the file data set in an outer track of said disc recording medium; and
(b) recording said audio and/or video data set in an inner track of said disc recording medium.

25. The method of claim 23, which includes:
(a) recording the file data set in an inner track of the disc recording medium; and
(b) recording said audio and/or video data set in an outer track of said disc recording medium.

26. The method of claim 21, wherein said file data set includes a logical address.

27. The method of claim 21, wherein said file data set includes a file name.

28. The method of claim 21, wherein said file data set includes a time code.

29. The method of claim 21, wherein said file data set includes a data size.

30. The method of claim 21, further comprising recording said audio/video data subset according to said file data set.

31. The method of claim 21, wherein said recording medium is capable of non-linear access.

32. The method of claim 31, wherein the recording medium capable of non-linear access comprises a disc recording medium.

33. The method of claim 32, wherein said disc recording medium comprises a hard disc.

34. The method of claim 33, which includes recording the audio and/or video data set in a memory.

35. The method of claim 21, which includes generating a second file data set to identify said audio and/or video data set.

36. The method of claim 35, wherein said second file data set includes at least one of:
(a) a file name corresponding to the audio and/or video data set;
(b) a logical address of the audio and/or video data set;
(c) a size of the audio and/or video data set; and
(d) a time code of the audio and/or video data set.

37. The method of claim 21, which includes setting said subset start point and said subset end point before said audio and/or video data subset is recorded on a disk recording medium.

38. The method of claim 21, wherein said audio and/or data subset includes a plurality of images recognizable by a user.

* * * * *